US009843753B2

(12) United States Patent
Sun et al.

(10) Patent No.: US 9,843,753 B2
(45) Date of Patent: Dec. 12, 2017

(54) IMAGING SYSTEMS INCLUDING ROW-PERIOD COMPENSATORS AND ASSOCIATED METHODS

(71) Applicant: OmniVision Technologies, Inc., Santa Clara, CA (US)

(72) Inventors: Tianjia Sun, San Jose, CA (US); Chun-Ming Tang, San Jose, CA (US); Jingyi Liu, Sunnyvale, CA (US); Xin Hu, Mountain View, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 0 days.

(21) Appl. No.: 14/930,099

(22) Filed: Nov. 2, 2015

(65) Prior Publication Data
US 2017/0127003 A1 May 4, 2017

(51) Int. Cl.
| | |
|---|---|
| *H04N 3/14* | (2006.01) |
| *H04N 5/369* | (2011.01) |
| *H02M 3/156* | (2006.01) |
| *H04N 5/232* | (2006.01) |
| *G03B 7/26* | (2006.01) |

(52) U.S. Cl.
CPC ............ *H04N 5/3698* (2013.01); *G03B 7/26* (2013.01); *H02M 3/156* (2013.01); *H04N 5/23241* (2013.01)

(58) Field of Classification Search
None
See application file for complete search history.

(56) References Cited

U.S. PATENT DOCUMENTS

| | | | | |
|---|---|---|---|---|
| 6,759,657 | B2* | 7/2004 | Iida | H01L 27/14634 250/332 |
| 7,466,355 | B2* | 12/2008 | Takami | H04N 5/335 348/312 |
| 8,742,313 | B2* | 6/2014 | Takamiya | H04N 5/374 250/214 R |
| 8,872,088 | B2 | 10/2014 | Zhang et al. | |
| 2003/0020821 | A1* | 1/2003 | Watanabe | H04N 5/23241 348/312 |
| 2005/0068459 | A1* | 3/2005 | Holmes | H05B 33/0815 348/372 |

(Continued)

*Primary Examiner* — Twyler Haskins
*Assistant Examiner* — Wesley Chiu
(74) *Attorney, Agent, or Firm* — Lathrop Gage LLP

(57) ABSTRACT

An imaging system includes an image sensor and a row-period compensator. The image sensor includes an array of photosensitive pixels and electrical circuitry for controlling the array of photosensitive pixels and for reading accumulated electrical charge therefrom. The electrical circuitry is at least partially powered from a positive power rail and a negative power rail. The row-period compensator is for compensating for a change in current drawn by the electrical circuitry during at least part of a row-period of the image sensor, and the row-period compensator is electrically coupled between the positive and negative power rails. A method for compensating for a change in current drawn by electrical circuitry of an image sensor includes controlling a magnitude of compensation current drawn by a row-period compensator, to compensate for a change in current drawn by the electrical circuitry of the image sensor.

14 Claims, 7 Drawing Sheets

(56) References Cited

U.S. PATENT DOCUMENTS

| | | | | |
|---|---|---|---|---|
| 2006/0181246 A1* | 8/2006 | Hackner | ............... | H02M 1/08 |
| | | | | 320/148 |
| 2008/0158398 A1* | 7/2008 | Yaffe | ............... | H04N 5/35581 |
| | | | | 348/294 |
| 2009/0256540 A1* | 10/2009 | Yang | ............... | G05F 1/575 |
| | | | | 323/282 |
| 2011/0115958 A1* | 5/2011 | Koseki | ............... | H04N 5/3658 |
| | | | | 348/308 |
| 2011/0292259 A1* | 12/2011 | Namba | ............... | H02M 1/36 |
| | | | | 348/294 |

* cited by examiner

IMAGING SYSTEMS INCLUDING ROW-PERIOD COMPENSATORS AND ASSOCIATED METHODS

BACKGROUND

Image sensors include an array of photosensitive pixels which accumulate electric charge in response to incident light. Modern image sensors include a large number of photosensitive pixels, such as millions of photosensitive pixels, to achieve high imaging resolution. These image sensors also typically include extensive electrical circuitry to control the photosensitive pixels and to read-out accumulated electrical charge from the photosensitive pixels. For example, some image sensors include a respective read-out circuit for each column of photosensitive pixels, where the read-out circuit (1) reads-out electrical charge as electrical signals from its respective column of photosensitive pixels and (2) digitizes the electrical signals to generate pixel image data. Each read-out circuit includes, for example, an operational amplifier (op-amp) configured as a comparator for digitizing the electrical signals.

Magnitude of current drawn by the electrical circuitry may vary significantly over time. For example, magnitude of current drawn by op-amps in read-out circuitry may vary significantly over a row-period of the image sensor, where the row-period is a period of time where pixel image data is read-out from a given row of pixels in the array of pixels. Although variation in magnitude of current drawn by any one particular electrical component may be small, collective variation in current drawn by all electrical components of the electrical circuitry may be relatively large. This variation in magnitude of current drawn may cause distortion on imaging system power rails.

For example, FIG. 1 illustrates a prior art image sensor 100 including an array 102 of photosensitive pixels 104 and associated electrical circuitry 106. To promote illustrative clarity, not all photosensitive pixels 104 are labeled in FIG. 1. Electrical circuitry 106, which controls photosensitive pixels 104 and reads pixel image data therefrom, is powered from a positive power rail 108 and a negative power rail 110. Positive power rail 108 has a parasitic impedance 112, and negative power rail 110 has a parasitic impedance 114. Each of parasitic impedance 112 and 114 has a resistive component and an inductive component. Although parasitic impedances 112 and 114 are shown as lumped elements for illustrative convenience, parasitic impedances 112 and 114 are actually distributed along their respective power rails.

Positive power rail 108 and negative power rail 110 are powered by an electric power source 116 having a voltage $V_{in}$. Voltage across positive power rail 108 and negative power rail 110 at electrical circuitry 106 is designed as voltage $V_e$. Voltage $V_e$ at electrical circuitry 106 may not be the same as voltage $V_{in}$ at electric power source 116 due to presence of parasitic impedances 112 and 114. Electrical circuitry 106 draws current $I_e$ from electric power source 116.

Current $I_e$ may change due to changes in operating conditions of electrical circuitry 106. Change in current $I_e$ will cause voltage to develop across parasitic impedances 112 and 114, thereby distorting voltage $V_e$. For example, voltage $V_{112}$ across parasitic impedance 112 due to a change in current $I_e$ is defined as follows, where $\Delta I_e$ is change in current $I_e$, $\Delta T$ is rate of change in current $I_e$, $R_{112}$ is the resistive component of parasitic impedance 112, and $L_{112}$ is the inductive component of parasitic impedance 112:

$$V_{112}=(\Delta I_e)(R_{112})+(\Delta I_e)(L_{112})/(\Delta T) \quad \text{EQN. 1}$$

Similarly, voltage $V_{114}$ across parasitic impedance 114 due to a change in current $I_e$ is defined as follows, where $R_{114}$ is the resistive component of parasitic impedance 114, and $L_{114}$ is the inductive component of parasitic impedance 114:

$$V_{114}=(\Delta I_e)(R_{114})+(\Delta I_e)(L_{114})/(\Delta T) \quad \text{EQN. 2}$$

Distortion $\Delta V_e$ of voltage $V_e$ due to change in current $I_e$, is defined as follows:

$$\Delta V_e=(\Delta I_e)(R_{112}+R_{114})+(\Delta I_e)(L_{112}+L_{114})/(\Delta T) \quad \text{EQN. 3}$$

Thus, distortion of voltage $V_e$ includes a component that is directly proportional to magnitude of change in current $I_e$, and distortion of voltage $V_e$ includes a component that is indirectly proportional to rate of change of current $I_e$.

Electrical circuitry 106 often includes electrical components, such as analog electrical components like op-amps, which are sensitive to changes in voltage $V_e$. Consequentially, distortion of voltage $V_e$ may cause improper operation of image sensor 100. For example, distortion of voltage $V_e$ may cause horizontal-banding (H-banding) artifacts in pixel image data generated by image sensor 100. Accordingly, it is desirable to minimize distortion of voltage $V_e$.

One conventional technique for minimizing distortion of voltage $V_e$ is to include clamping circuits in electrical circuitry 106 to limit changes in current $I_e$. This technique, however, requires adding components to image sensor 100, thereby increasing cost, complexity, and size of the image sensor. Another conventional technique for minimizing distortion of voltage $V_e$ is to minimize parasitic impedances 112 and 114. This technique, however, requires increasing cross-sectional area of positive power rail 108 and negative power rail 110, and/or increasing conductivity of the power rails, which may be undesirable or infeasible due to cost, space, and/or manufacturing process constraints.

SUMMARY

In an embodiment, an imaging system includes an image sensor and a row-period compensator. The image sensor includes an array of photosensitive pixels and electrical circuitry for controlling the array of photosensitive pixels and for reading accumulated electrical charge therefrom. The electrical circuitry is at least partially powered from a positive power rail and a negative power rail. The row-period compensator is for compensating for a change in current drawn by the electrical circuitry during a row-period of the image sensor, and the row-period compensator is electrically coupled between the positive power rail and the negative power rail.

In an embodiment, a method for compensating for a change in current drawn by electrical circuitry of an image sensor electrically coupled to positive and negative power rails includes controlling a magnitude of compensation current drawn by a row-period compensator electrically coupled between the positive and negative power rails, to compensate for a change in current drawn by the electrical circuitry of the image sensor during a row-period of the image sensor.

DETAILED DESCRIPTION OF THE EMBODIMENTS

Applicants have developed row-period compensators which advantageously minimize, or even essentially eliminate, voltage distortion in imaging system power rails by compensating for changes in electrical current drawn by image sensor electrical circuitry during at least part of a row-period of the image sensor. The row-period compensators advantageously do not require adding components to the image sensor control or read-out circuitry, thereby promoting low cost and ease of image sensor design. Additionally, the row-period compensators do not require reducing parasitic impedance of power rails, thereby further promoting low cost and ease of image sensor design, as well as ease of image sensor manufacturing.

Figure 1:
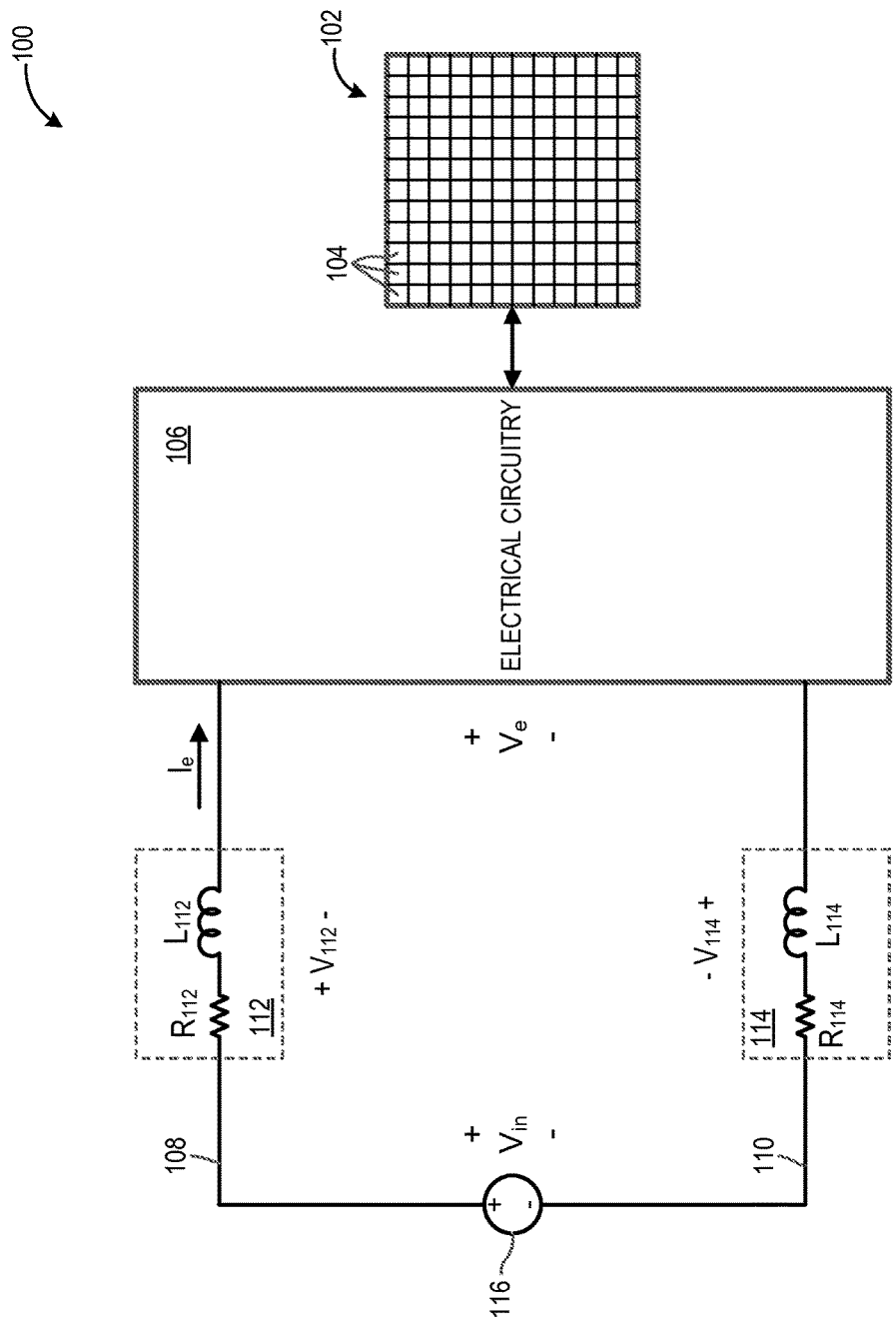
FIG. 1 illustrates a prior art image sensor.
Figure 2:
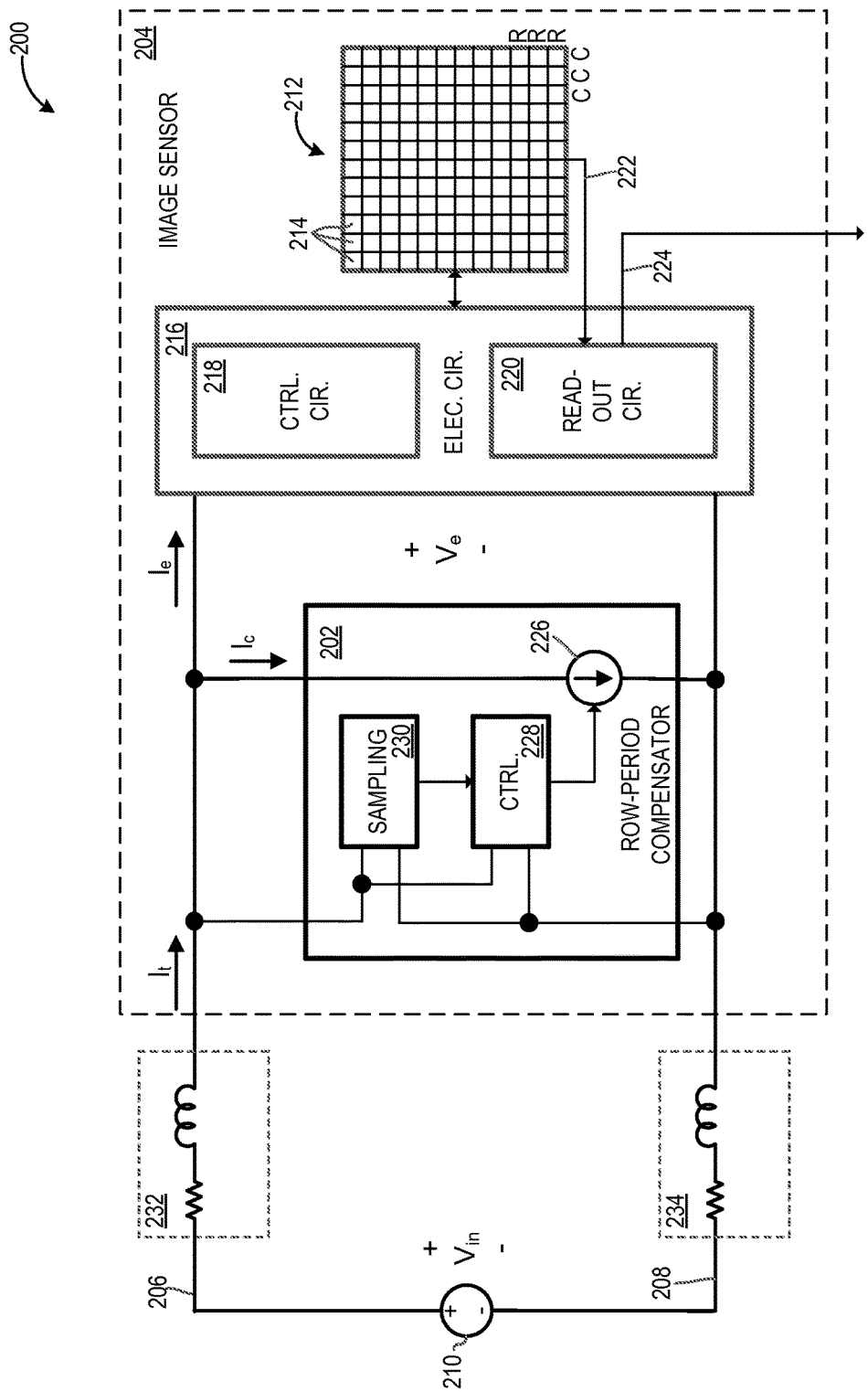
FIG. 2 illustrates an imaging system including a row-period compensator, according to an embodiment.

FIG. 2 illustrates an imaging system 200 including a row-period compensator 202, an image sensor 204, a positive power rail 206, and a negative power rail 208. Row-period compensator 202 is sometimes referred to herein as "compensator 202" for brevity. Positive power rail 206 and negative power rail 208 are collectively powered by an electric power source 210 having a voltage $V_{in}$. Although electric power source 210 is illustrated as being part of imaging system 200, electrical power source 210 could alternately be external to imaging system 200 without departing from the scope hereof.

Image sensor 204 includes an array 212 of photosensitive pixels 214, compensator 202, and electrical circuitry 216. Photosensitive pixels 214 are arranged in array 212 as a plurality of rows R and columns C. Each photosensitive pixel 214 accumulates electrical charge in response to light incident thereon. In some embodiments, a color filter array (not shown), such as a color filter array having a Bayer pattern of red, green, and blue color filters, is disposed in optical communication with photosensitive pixels 214, to enable color imaging by array 212. Only some instances of photosensitive pixels 214, rows R, and columns C are labeled in FIG. 2 to promote illustrative clarity.

Electrical circuitry 216 includes control circuitry 218 and read-out circuitry 220. Control circuitry 218, which is communicatively coupled to array 212, controls electrical charge accumulation by photosensitive pixels 214 and read-out of array 212. For example, in some embodiments, control circuitry 218 is capable of controlling array 212 to operate in either a global shutter or a rolling shutter image data acquisition mode. The global shutter image data acquisition mode is characterized by control circuitry 218 causing all photosensitive pixels 214 in array 212 to simultaneously accumulate electrical charge in response to incident light, whereafter all pixels are read-out before the next cycle of charge accumulation. The rolling shutter image data acquisition mode, in contrast, is characterized by control circuitry 218 causing sequential read-out of rows of photosensitive pixels 214 within array 212 and staggered electrical charge accumulation for the rows. Pixel array 212 is read-out in a row-by-row manner in both the global shutter image data acquisition mode and the rolling shutter image data acquisition mode.

Read-out circuitry 220 is also communicatively coupled to array 212. Read-out circuitry 220 reads accumulated electrical charge from photosensitive pixels 214 of array 212 in the form of electrical signals 222. Read-out circuitry 220 also digitizes electrical signals 222 to generate digital pixel image data 224. Digital pixel image data 224 is, for example, processed by an external image data processing system (not shown), displayed on a display device (not shown), and/or stored in a storage device (not shown) for subsequent use.

Electrical circuitry 216 is at least partially powered from positive power rail 206 and negative power rail 208. Compensator 202 is electrically coupled between positive power rail 206 and negative power rail 208, and compensator 202 is ideally disposed near electrical circuitry 216 to minimize impedance between compensator 202 and electrical circuitry 216. For example, in some embodiments, electrical circuitry 216 and compensator 202 are co-packaged in a common integrated circuit package to minimize impedance between these two components. Although compensator 202 is implemented within image sensor 204 in system 200 to minimize impedance between compensator 202 and electrical circuitry 216, compensator 202 could alternately be external to image sensor 204 without departing from the scope hereof.

Compensator 202 compensates for change in magnitude of current $I_e$ during at least part of each row-period of image sensor 204. Compensator 202 includes a current source 226, a controller 228, and sampling circuitry 230. Current source 226 is electrically coupled between positive power rail 206 and negative power rail 208 and draws a compensation current $I_c$. In certain embodiments, compensation current $I_c$ may have direction opposite that shown in FIG. 2 under some operating conditions. Sampling circuit 230 samples voltage $V_e$ across positive power rail 206 and negative power rail 208 at electrical circuitry 216 to establish a reference voltage $V_{ref}$. In some embodiments, sampling circuit 230 samples voltage $V_e$ during each row-period of image sensor 204 to establish a new value of reference voltage $V_{ref}$ for each row-period. Sampling circuit 230 and controller 228 each have a high input impedance so that they does not materially draw current from positive power rail 206 and negative power rail 208. Controller 228 compensates for change in magnitude of current $I_e$ during at least part of each row-period of image sensor 204 by controlling current source 226 to adjust magnitude of compensation current $I_c$ drawn by compensator 202 as needed to minimize a difference between voltage $V_{ref}$ and voltage $V_e$, thereby preventing change in current $I_e$ from changing magnitude of voltage $V_e$.

Figure 3:
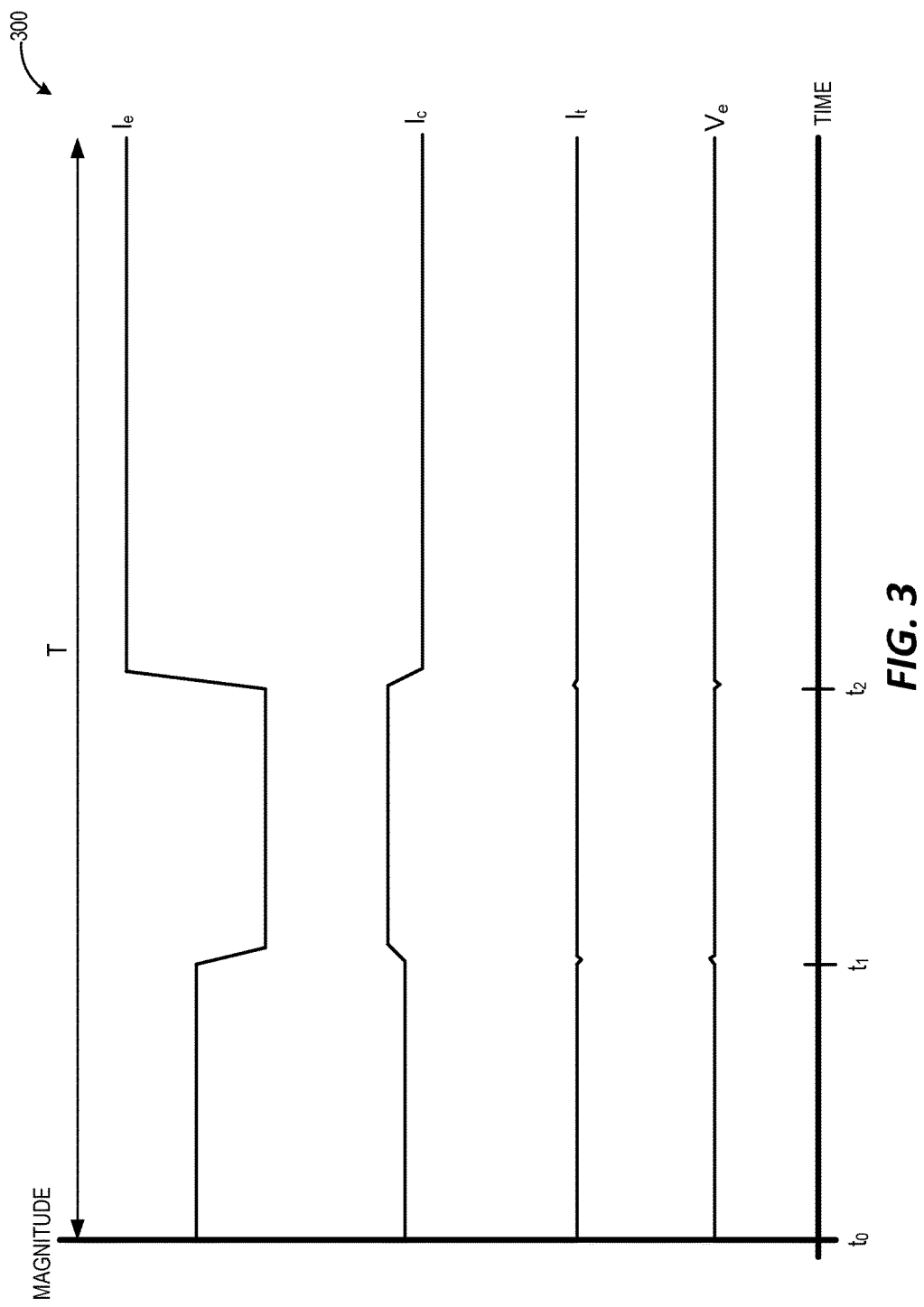
FIG. 3 illustrates a scenario where the row-period compensator of FIG. 2 compensates for a change in current drawn by electrical circuitry in the imaging system of FIG. 2.

For example, FIG. 3 illustrates a scenario 300 where compensator 202 compensates for a change in current $I_e$ drawn by electrical circuitry 216 during a row-period T. Between time $t_o$ and time $t_1$, current $I_e$ drawn by electrical circuitry 216 is 1.0 amperes, compensation current $I_c$ drawn by compensator 202 is 0.20 amperes, and total current $I_t$ drawn by electrical circuitry 216 and compensator 202 is 1.20 amperes. At time $t_1$, however, current $I_e$ drops to 0.9 amperes, causing magnitude of voltage $V_e$ to begin to increase. Controller 228 detects this beginning of increase in voltage $V_e$, and in response, controller 228 controls current source 226 to increase compensation current $I_c$ from 0.20 amperes to 0.30 amperes, thereby compensating from the drop in current $I_e$ and causing total current $I_t$ to remain at 1.20 amperes, except for a slight momentary decrease at time $t_1$.

At time $t_2$, current $I_e$ rises to 1.1 amperes, causing magnitude of voltage $V_e$ to begin to decrease. Controller 228 detects this beginning of decrease in voltage $V_e$, and in response, controller 228 controls current source 226 to decrease compensation current $I_c$ from 0.30 amperes to 0.10 amperes, thereby compensating from the increase in current $I_e$ and causing total current $I_t$ to remain at 1.20 amperes, except for a slight momentary increase at time $t_2$.

The fact that compensator 202 keeps magnitude of total current $I_t$ essentially constant during at least part of a row-period prevents significant voltage change across parasitic impedance 232 in positive power rail 206 and across parasitic impedance 234 in negative power rail 208, thereby preventing changes in voltage $V_e$ except for slight changes at times $t_1$ and $t_2$. Accordingly, compensator 202 largely eliminates distortion in voltage $V_e$ in scenario 300.

Compensator 200 could be modified so that sampling circuitry 230 detects changes in current $I_e$ drawn by electrical circuitry 216, instead of detecting changes in voltage $V_e$. For example, sampling circuitry 230 could be modified to include a current sensing resistor or a hall-effect sensor to establish a reference current, and controller 228 could be modified to control current source 226 to minimize a difference between the reference current and current $I_e$, to minimize change in total current $I_t$ in response to a change in current $I_e$ during each row-period.

Figure 4:
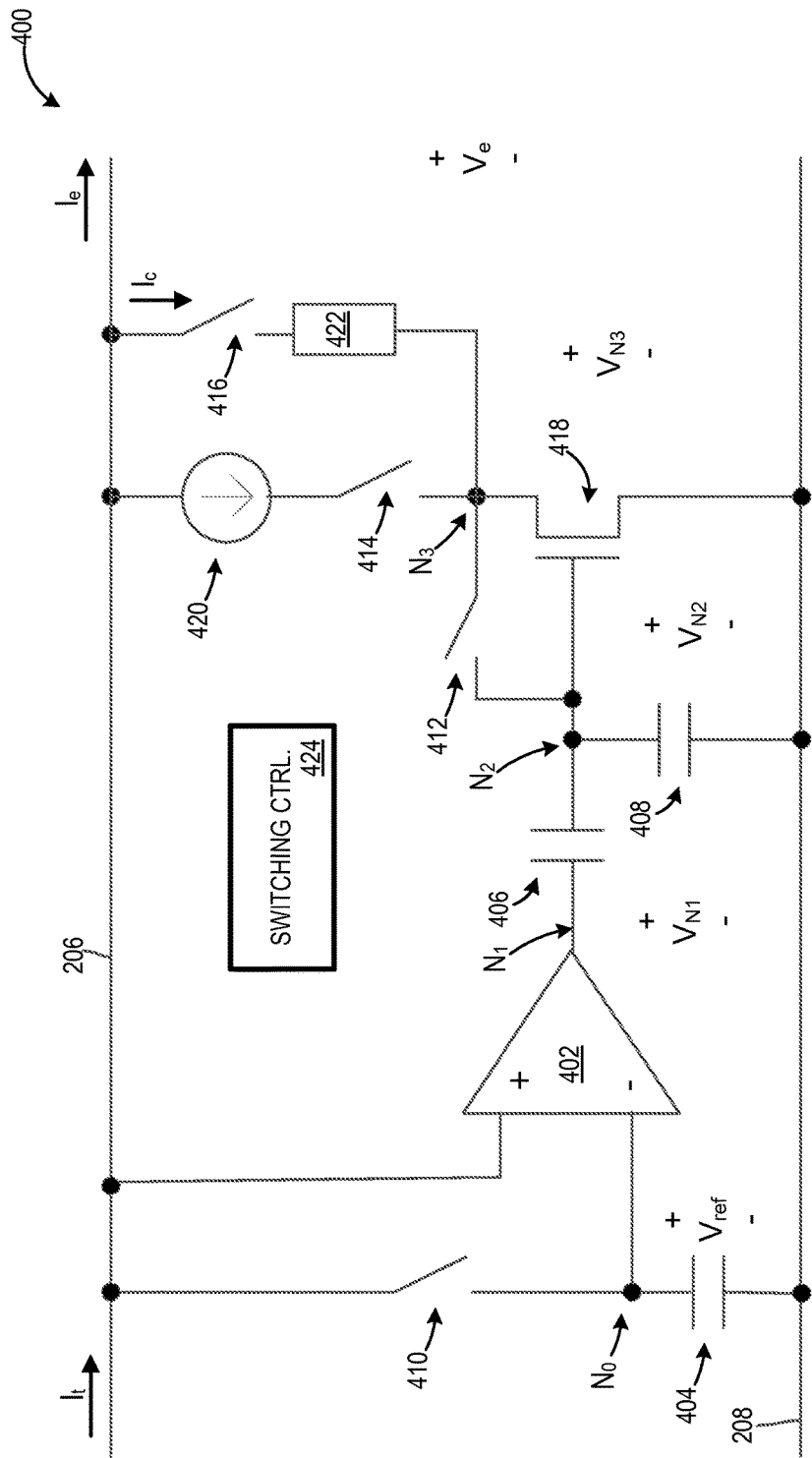
FIG. 4 illustrates one possible embodiment of the row-period compensator of FIG. 2.

FIG. 4 illustrates a compensator 400, which is one possible embodiment of compensator 202 of FIG. 2. Compensator 400 includes an amplifier 402, a first capacitor 404, a second capacitor 406, a third capacitor 408, a first switching device 410, a second switching device 412, a third switching device 414, a fourth switching device 416, a transistor 418, an initializing current source 420, a resistive device 422, and a switching controller 424. In the context of this document, a switching device is a device capable of switching between a conductive and non-conductive state. The switching device operates in its conductive state when the switching device is closed, and the switching device operates in its non-conductive state when the switching device is opened. Examples of switching devices include, but are not limited to, field effect transistors (FETs) and bipolar junction transistors (BJTs).

First switching device 410 and first capacitor 404 are electrically coupled in series between positive power rail 206 and negative power rail 208, and an inverting input of amplifier 402 is electrically coupled to a node $N_0$ where first capacitor 404 and first switching device 410 are joined. The non-inverting input of amplifier 402 is electrically coupled to positive power rail 206, and the output of amplifier 402 is electrically coupled to a node $N_1$. Second capacitor 406 is electrically coupled between nodes $N_1$ and $N_2$, and third capacitor 408 is electrically coupled between node $N_2$ and negative power rail 208. A gate (G) of transistor 418 is electrically coupled to node $N_2$, and a channel of transistor 418 is electrically coupled between a node $N_3$ and negative power rail 208. Second switching device 412 is electrically coupled between node $N_2$ and node $N_3$. Initializing current source 420 and third switching device 414 are electrically coupled in series between positive power rail 206 and node $N_3$, and fourth switching device 416 and resistive device 422 are electrically coupled in series between positive power rail 206 and node $N_3$.

Figure 5:
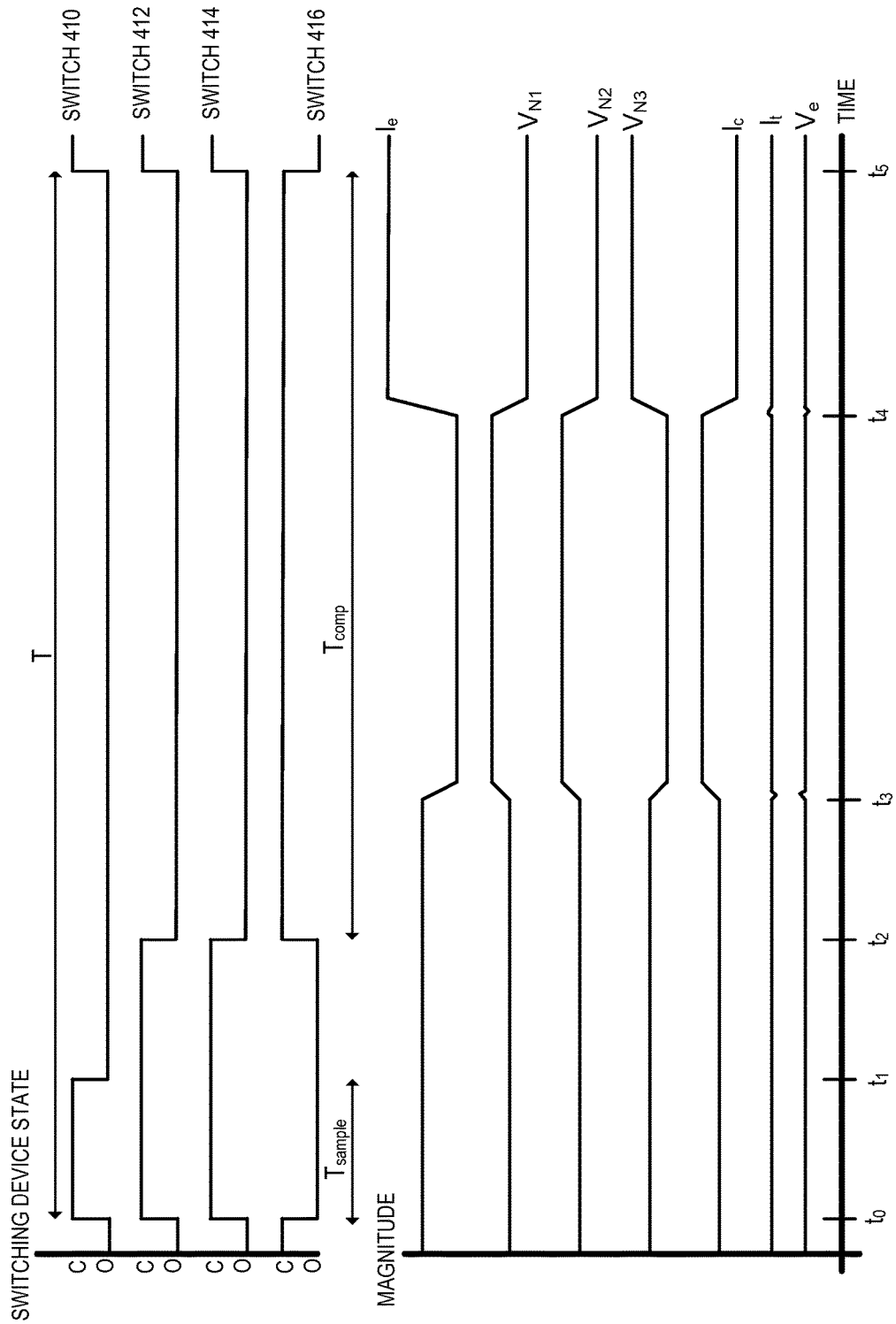
FIG. 5 illustrates one example of operation of the row-period compensator of FIG. 4 during a row-period.

FIG. 5 illustrates one example of operation of compensator 400 during a row-period T. FIGS. 4 and 5 are best viewed together in the following discussion. With respect to the states of switching devices 410, 412, 414, and 416, the designation "C" in FIG. 5 means that the switching device is closed, and the designation "O" in FIG. 5 means that the switching device is open.

At time $t_o$, which denotes the beginning of row-period T, switching controller 424 causes first switching device 410, second switching device 412, and third switching device 414 to switch from their non-conductive states to their conductive states. Switching controller 424 also causes fourth switching device 416 to switch from its conductive state to its non-conductive state at time $t_o$. First switching device 410 and first capacitor 404 serve as sampling circuitry during a sampling period $T_{sample}$ between times $t_o$ and $t_1$. Specifically, first capacitor 404 is electrically coupled to positive voltage rail 206 via first switching device 410, such that a reference voltage $V_{ref}$ across first capacitor 404 is charged to voltage $V_e$. Switching controller 424 then causes first switching device 410 to change from its conductive state to its non-conductive state at time $t_1$.

A control voltage $V_{N2}$ at node $N_2$ is set between times $t_o$ and time $t_2$ by coupling node $N_2$ to node $N_3$ via second switching device 412. Third capacitor 408 is charged to a voltage $V_{N3}$ at node $N_3$ via initializing current source 420 during this time period, where voltage $V_{N3}$ is equal to voltage across the channel of transistor 418. Voltage $V_{N3}$ is set to achieve a desired compensation current $I_c$ through resistive device 422 at time $t_2$, as discussed below. Voltage $V_{N3}$ at time $t_2$ may be adjusted by adjusting the magnitude of current through initialization current source 420 between times $t_o$ and time $t_2$.

Switching controller 424 causes second switching device 412 and third switching device 414 to switch from their conductive states to their non-conductive states at time $t_2$, and switching controller 424 causes fourth switching device 416 to switch from its non-conductive state to its conductive state at time $t_2$. Compensator 400 is ready to compensate for changes in current $I_e$ at time $t_2$. Resistive device 422 and transistor 418 collectively serve as current source 226 (FIG. 2) when fourth switching device 416 is operating in its conductive state. Accordingly, compensation current $I_c$ through compensator 400 is defined as follows, where $R_{422}$ is the resistance of resistive device 422, when fourth switching device 416 is operating in its conductive state:

$$I_c = (V_e - V_{N3})/R_{422} \qquad \text{EQN. 4}$$

Voltage $V_{N3}$ at time $t_2$ must be sufficiently small so that magnitude of compensation current $I_c$ through resistive device 422 is sufficiently large to compensate for expected increase in current $I_e$. For example, assume that current $I_e$ is expected to increase by up to 0.1 amperes during row-period T. Voltage $V_{N3}$ at time $t_2$ must be sufficiently small so that compensation current $I_c$ at time $t_2$ is at least 0.1 amperes, to allow compensator 400 to compensate for up to a 0.1 ampere increase in current $I_e$.

Figure 6:
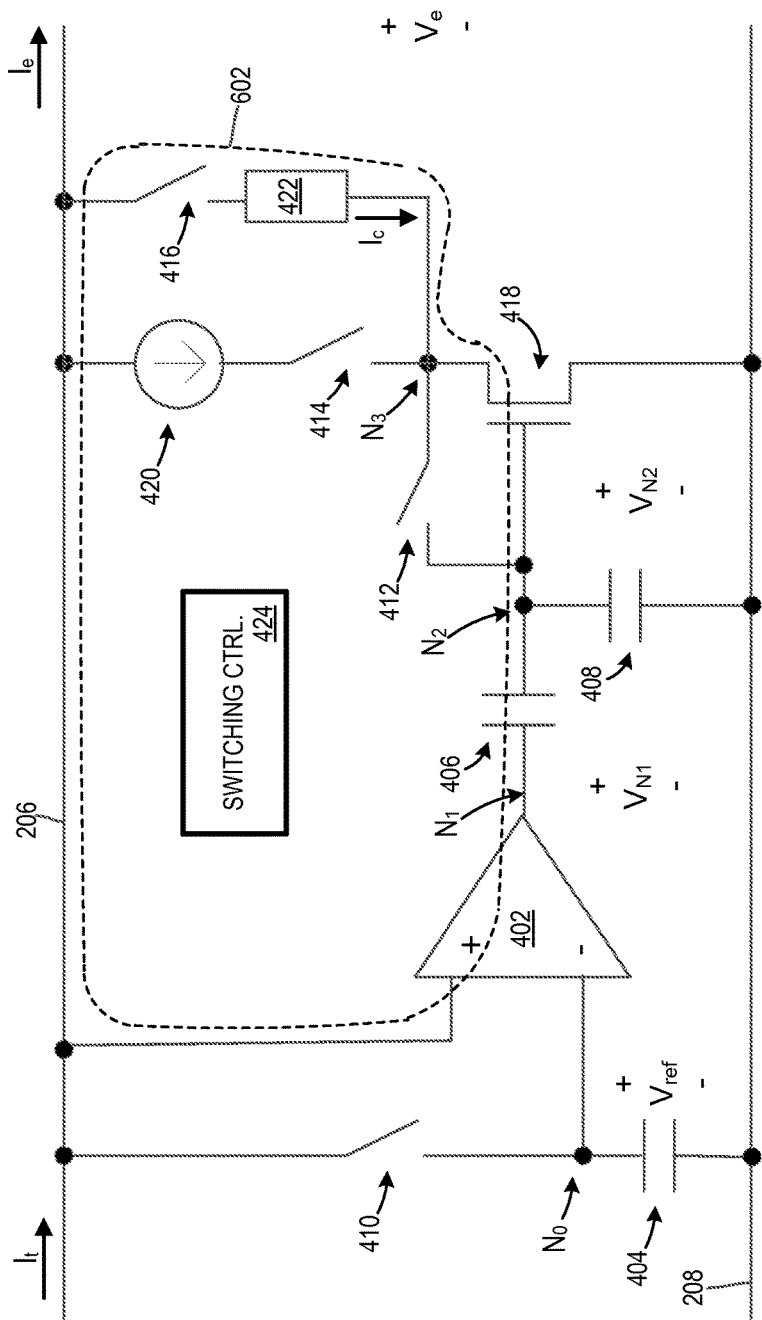
FIG. 6 illustrates a closed-loop feedback path of the row-period compensator of FIG. 4.

Compensator 400 regulates voltage $V_e$ during time period $T_{comp}$ by automatically adjusting magnitude of compensation current $I_c$ so that voltage $V_e$ remains essentially constant. FIG. 6 illustrates a negative closed-loop feedback path 602 exhibited by compensator 400 during time period $T_{comp}$, to regulate voltage $V_e$. In some embodiments, the time period $T_{comp}$ corresponds to a portion of row period T where electrically circuitry 216 is sensitive to changes in voltage $V_e$.

FIG. 5 illustrates two examples of a change in magnitude of current $I_e$ and corresponding operation of compensator 400 to compensate for the change in current $I_e$. In particular, at time $t_3$ current $I_e$ decreases by 0.1 amperes, causing voltage $V_e$ to begin to increase. Amplifier 402 amplifies the difference between voltage $V_e$ and voltage $V_{ref}$, such that voltage $V_{N1}$ at node $N_1$ increases due to the increase in voltage $V_e$. Second capacitor 406 couples the increase in voltage $V_{N1}$ to node $N_2$, such that control voltage $V_{N2}$ also increases. The increase in voltage $V_{N2}$ causes channel resistance of transistor 418 to decrease, thereby causing compensation current $I_c$ to increase to compensate for the decrease in current $I_e$. Thus, amplifier 402 drives transistor 418 to minimize the difference between voltage $V_e$ and voltage $V_{ref}$.

At time $t_4$, current $I_e$ increases by 0.25 amperes, causing voltage $V_e$ to begin to decrease. Amplifier 402 amplifies the difference between voltage $V_e$ and voltage $V_{ref}$, thereby causing voltages $V_{N1}$ and $V_{N2}$ to decrease. The decrease in voltage $V_{N2}$ causes channel resistance of transistor 418 to increase, thereby causing compensation current $I_c$ to decrease to compensate for increase in current $I_e$.

Accordingly, compensator 400 compensates for changes in current $I_e$ during period $T_{comp}$ to causes total current $I_t$ and voltage $V_e$ to remain essentially constant during this time period, except for small changes in these values at times $t_3$ and $t_4$. At time $t_5$ switching controller 424 causes switching devices 410, 412, 414, and 416 to repeat the switching steps described above for the next row-period T.

Transistor 418 could be replaced with a different type of transistor without departing from the scope hereof. For example, transistor 418 could be replaced with a bipolar junction transistor, or a different type of field effect transistor, with appropriate changes to circuitry driving the transistor. Additionally, the positions of third switching device 414 and initializing current source 420 could be swapped. Furthermore, the positions of fourth switching device 416 and resistive device 422 could be swapped. Moreover, resistive device 422 could be omitted if transistor 418 is capable of controlling magnitude of compensation current $I_c$ without resistive device 422.

Figure 7:
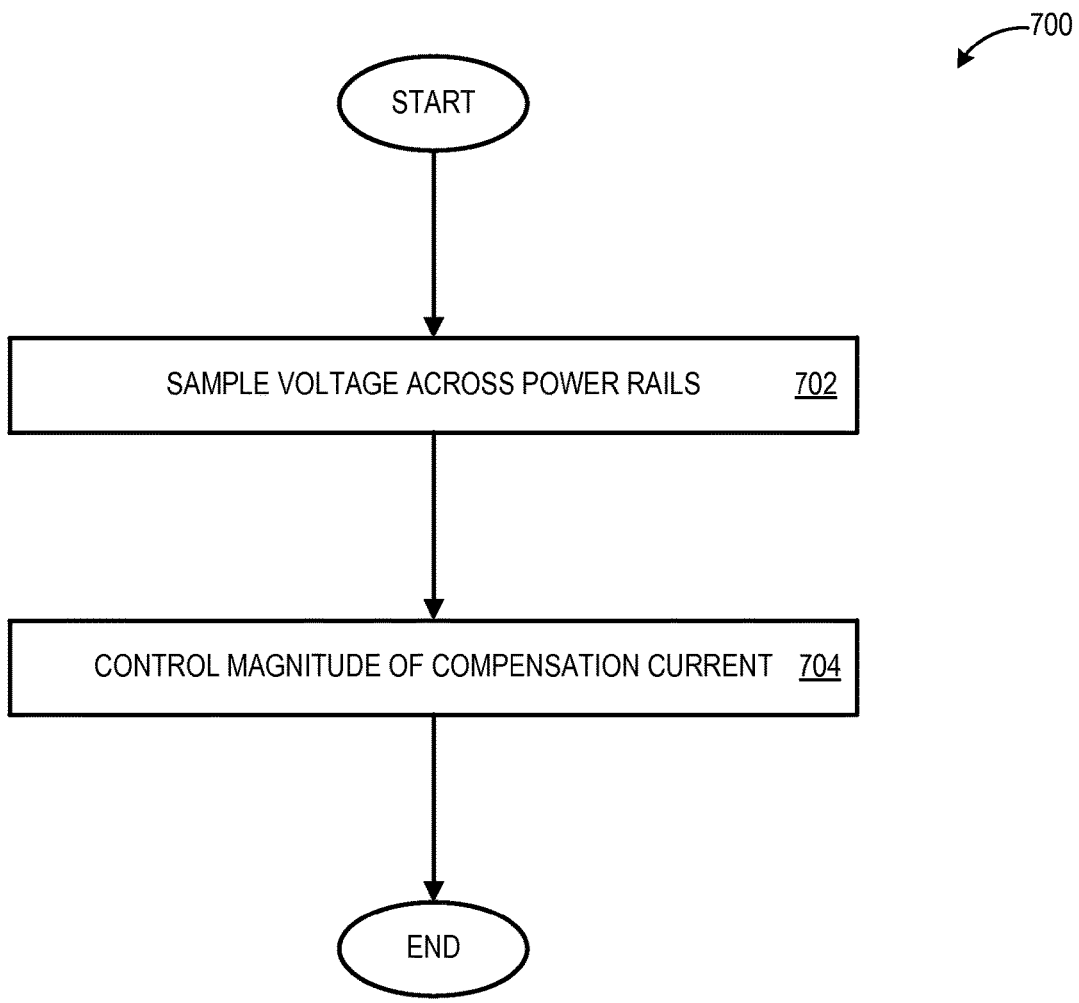
FIG. 7 illustrates a method for compensating for a change in current drawn by electrical circuitry of an image sensor, according to an embodiment.

FIG. 7 illustrates a method 700 for compensating for a change in current drawn by electrical circuitry of an image sensor electrically coupled to positive and negative power rails. In step 702, a voltage across the positive and negative power rails is sampled to establish a reference voltage. In one example of step 702, voltage $V_e$ across positive power rail 206 and negative power rail 208 is sampled by charging first capacitor 404 via first switching device 410 to establish voltage reference $V_{ref}$ (see FIG. 4). In step 704, magnitude of compensation current drawn by the row-period compensator is controlled according to a difference between the reference voltage and the voltage across the positive and negative power rails. In one example of step 704, amplifier 402 amplifies the difference between voltage $V_e$ and reference voltage $V_{ref}$ to drive transistor 418 via second capacitor 406 and third capacitor 408, to change magnitude of compensation current $I_c$ through resistive device 422 and transistor 418. Method 700 is repeated, for example, during every row-period of the image sensor.

In an alternate embodiment of method 700, magnitude of current drawn by the electrical circuitry is sampled in step 702 to establish a reference current. In this alternate embodiment, magnitude of compensation current drawn by the row-period compensator is controlled according to a difference between the reference current and the current drawn by the electrical circuitry, in step 704.

Combinations of Features

Features described above as well as those claimed below may be combined in various ways without departing from the scope hereof. The following examples illustrate some possible combinations:

(A1) An imaging system may include an image sensor and a row-period compensator. The image sensor may include an array of photosensitive pixels and electrical circuitry for controlling the array of photosensitive pixels and for reading accumulated electrical charge therefrom. The electrical circuitry may be at least partially powered from a positive power rail and a negative power rail. The row-period compensator may be for compensating for a change in current drawn by the electrical circuitry during at least part of a row-period of the image sensor, and the row-period compensator may be electrically coupled between the positive power rail and the negative power rail.

(A2) In the imaging system denoted as (A1), the row-period compensator may include (1) a current source electrically coupled between the positive and negative power rails, (2) sampling circuitry for sampling a voltage across the positive and negative power rails to establish a reference voltage, and (3) a controller for controlling a magnitude of a compensation current flowing through the current source based at least partially on a difference between the reference voltage and the voltage across the positive and negative power rails.

(A3) In the imaging system denoted as (A2): (1) the current source may include a resistive device electrically coupled in series with a transistor, (2) the sampling circuitry may include a first capacitor and a first switching device electrically coupled in series between the positive and negative power rails, the reference voltage being a voltage across the capacitor, and (3) the controller may include an amplifier for driving the transistor according to a difference between the reference voltage and the voltage across the positive and negative power rails.

(A4) In the imaging system denoted as (A3), the controller may be configured to drive the transistor to minimize the difference between the reference voltage and the voltage across the positive and negative power rails.

(A5) In the imaging system denoted as (A1), the row-period compensator may include (1) a current source electrically coupled between the positive and negative power rails, (2) sampling circuitry for sampling the current drawn by the electrical circuitry to establish a reference current, and (3) a controller for controlling a magnitude of a compensation current flowing through the current source based at least partially on a difference between the reference current and the current drawn by the electrical circuitry.

(A6) In any of the imaging systems denoted as (A1) through (A5), the controller may be configured to control a magnitude of compensation current drawn by the row-period compensator such that a voltage across the positive and negative power rails does not change in response to a change in the current drawn by the electrical circuitry.

(A7) In any of the imaging systems denoted as (A1) through (A6), the controller may be configured to control the row-period compensator such that a total current equal to a sum of a compensation current drawn by the row-period compensator and the current drawn by the electrical circuitry does not change in response to a change in the current drawn by the electrical circuitry.

(A8) In any of the imaging systems denoted as (A1) through (A7), the row-period compensator may be part of the image sensor.

(A9) In any of the imaging systems denoted as (A1) through (A8), the row-period compensator and the electrical circuitry may be co-packaged in a common integrated circuit.

(B1) A method for compensating for a change in current drawn by electrical circuitry of an image sensor electrically coupled to positive and negative power rails may include controlling a magnitude of compensation current drawn by a row-period compensator electrically coupled between the positive and negative power rails, to compensate for a change in current drawn by the electrical circuitry of the image sensor during at least part of a row-period of the image sensor.

(B2) The method denoted as (B1) may further include (1) sampling a voltage across the positive and negative power rails to establish a reference voltage, and (2) controlling the magnitude of the compensation current drawn by the row-period compensator according to a difference between the reference voltage and the voltage across the positive and negative power rails.

(B3) In the method denoted as (B2), the step of controlling the magnitude of the compensation current drawn by the row-period compensator may include (1) amplifying the difference between the reference voltage and the voltage across the positive and negative power rails to generate a control voltage, and (2) controlling operation of a transistor electrically coupled in series with a resistive device between the positive and negative power rails according to the control voltage.

(B4) Either or both of the methods denoted as (B2) or (B3) may further include repeating the steps of sampling the voltage across the positive and negative power rails and controlling the magnitude of the compensation current drawn by the row-period compensator for each row-period of the image sensor.

(B5) Any of the methods denoted as (B2) through (B4) may further include controlling the magnitude of the compensation current drawn by the row-period compensator to minimize the difference between the reference voltage and the voltage across the positive and negative power rails.

(B6) Any of the methods denoted as (B3) through (B5) may further include setting an initial magnitude of the compensation current drawn by the row-period compensator at the beginning of a compensation period.

(B7) In the method denoted as (B6), the step of setting the initial magnitude of the compensation current may include setting an initial value of the control voltage at the beginning of the compensation period.

Changes may be made in the above system and methods without departing from the scope hereof. For example, although the row-period compensators are discussed in the context of image sensors, the row-period compensators could be modified for use with other electronic devices. It should thus be noted that the matter contained in the above description and shown in the accompanying drawings should be interpreted as illustrative and not in a limiting sense. The following claims are intended to cover generic and specific features described herein, as well as all statements of the scope of the present method and system, which, as a matter of language, might be said to fall therebetween.

What is claimed is:

1. An imaging system, comprising:
an image sensor, including:
an array of photosensitive pixels, and
electrical circuitry for controlling the array of photosensitive pixels and for reading accumulated electrical charge therefrom, the electrical circuitry at least partially powered from a positive power rail and a negative power rail; and
a row-period compensator for compensating for a change in current drawn by the electrical circuitry during at least part of a row-period of the image sensor, the row-period compensator electrically coupled between the positive power rail and the negative power rail and including:
a current source electrically coupled between the positive and negative power rails;
sampling circuitry for sampling a voltage across the positive and negative power rails to establish a reference voltage; and
a controller for controlling a magnitude of a compensation current flowing through the current source based at least partially on a difference between the reference voltage and the voltage across the positive and negative power rails.

2. The imaging system of claim 1, wherein:
the current source comprises a resistive device electrically coupled in series with a transistor;
the sampling circuitry comprises a first capacitor and a first switching device electrically coupled in series between the positive and negative power rails, the reference voltage being a voltage across the capacitor; and
the controller comprises an amplifier for driving the transistor according to a difference between the reference voltage and the voltage across the positive and negative power rails.

3. The imaging system of claim 2, the controller configured to drive the transistor to minimize the difference between the reference voltage and the voltage across the positive and negative power rails.

4. The imaging system of claim 1, the controller being configured to control a magnitude of compensation current drawn by the row-period compensator such that a voltage across the positive and negative power rails does not change in response to a change in the current drawn by the electrical circuitry.

5. The imaging system of claim 1, the controller being configured to control the row-period compensator such that a total current equal to a sum of a compensation current drawn by the row-period compensator and the current drawn by the electrical circuitry does not change in response to a change in the current drawn by the electrical circuitry.

6. The imaging system of claim 1, the row-period compensator being part of the image sensor.

7. The imaging system of claim 1, the row-period compensator and the electrical circuitry being co-packaged in a common integrated circuit.

8. A method for compensating for a change in current drawn by electrical circuitry of an image sensor electrically coupled to positive and negative power rails, comprising:
controlling a magnitude of compensation current drawn by a row-period compensator electrically coupled between the positive and negative power rails, to compensate for a change in current drawn by the electrical circuitry of the image sensor during at least part of a row-period of the image sensor;
sampling a voltage across the positive and negative power rails to establish a reference voltage; and
controlling the magnitude of the compensation current drawn by the row-period compensator according to a difference between the reference voltage and the voltage across the positive and negative power rails.

9. The method of claim 8, the step of controlling the magnitude of the compensation current drawn by the row-period compensator comprising:
   amplifying the difference between the reference voltage and the voltage across the positive and negative power rails to generate a control voltage; and
   controlling operation of a transistor electrically coupled in series with a resistive device between the positive and negative power rails according to the control voltage.

10. The method of claim 9, further comprising setting an initial magnitude of the compensation current drawn by the row-period compensator at the beginning of a compensation period.

11. The method of claim 10, the step of setting the initial magnitude of the compensation current comprising setting an initial value of the control voltage at the beginning of the compensation period.

12. The method of claim 9, further comprising repeating the steps of sampling the voltage across the positive and negative power rails and controlling the magnitude of the compensation current drawn by the row-period compensator for each row-period of the image sensor.

13. The method of claim 9, further comprising controlling the magnitude of the compensation current drawn by the row-period compensator to minimize the difference between the reference voltage and the voltage across the positive and negative power rails.

14. An imaging system, comprising:
   an image sensor, including:
      an array of photosensitive pixels, and
      electrical circuitry for controlling the array of photosensitive pixels and for reading accumulated electrical charge therefrom, the electrical circuitry at least partially powered from a positive power rail and a negative power rail; and
   a row-period compensator for compensating for a change in current drawn by the electrical circuitry during at least part of a row-period of the image sensor, the row-period compensator electrically coupled between the positive power rail and the negative power rail and including:
      a current source electrically coupled between the positive and negative power rails;
      sampling circuitry for sampling the current drawn by the electrical circuitry to establish a reference current; and
      a controller for controlling a magnitude of a compensation current flowing through the current source based at least partially on a difference between the reference current and the current drawn by the electrical circuitry.

\* \* \* \* \*